(12) United States Patent
Ashbolt et al.

(10) Patent No.: US 10,804,515 B2
(45) Date of Patent: Oct. 13, 2020

(54) BATTERIES HAVING VENTS

(71) Applicant: DURACELL U.S. OPERATIONS, INC., Wilmington, DE (US)

(72) Inventors: Mark Ashbolt, Newtown, CT (US); Alexander Shelekhin, Ridgefield, CT (US); Brien Merrill, New Fairfield, CT (US); Oleg Podoprigora, New Milford, CT (US); Robert S. Ferrin, Bethel, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 119 days.

(21) Appl. No.: 16/058,735

(22) Filed: Aug. 8, 2018

(65) Prior Publication Data

US 2020/0052264 A1 Feb. 13, 2020

(51) Int. Cl.
*H01M 2/12* (2006.01)
*H01M 2/02* (2006.01)
*H01M 2/04* (2006.01)
*H01M 2/30* (2006.01)

(52) U.S. Cl.
CPC ....... *H01M 2/1241* (2013.01); *H01M 2/0235* (2013.01); *H01M 2/0257* (2013.01); *H01M 2/046* (2013.01); *H01M 2/0426* (2013.01); *H01M 2/30* (2013.01)

(58) Field of Classification Search
CPC .... H01M 2/1241; H01M 2/30; H01M 2/0426; H01M 2/0235; H01M 2/0257; H01M 2/046
See application file for complete search history.

(56) References Cited

U.S. PATENT DOCUMENTS

| 6,620,543 | B2 | 9/2003 | Li |
| 7,875,376 | B2 | 1/2011 | Stearns et al. |
| 8,076,015 | B2 | 12/2011 | Bouffard et al. |
| 8,158,280 | B2 | 4/2012 | Ray et al. |
| 2004/0157115 | A1* | 8/2004 | Bouffard ............... H01M 6/085 429/56 |
| 2007/0009785 | A1 | 1/2007 | Kozuki et al. |

(Continued)

FOREIGN PATENT DOCUMENTS

| EP | 2337110 A1 | 6/2011 |
| WO | WO-2017110024 A1 | 6/2017 |
| WO | WO-2017119018 A1 | 7/2017 |

OTHER PUBLICATIONS

International Application No. PCT/US2019/040905, International Search Report and Written Opinion, dated Oct. 15, 2019.

*Primary Examiner* — Cynthia K Walls
(74) *Attorney, Agent, or Firm* — Marshall, Gerstein & Borun LLP

(57) ABSTRACT

Batteries having vents are disclosed. An example battery includes a housing, including: a first terminal and a second terminal. The first terminal includes a cover. The cover includes at least one line of weakness therein. The line of weakness is structured to form an opening when a threshold pressure is satisfied within the housing to enable gas to vent from the housing through the opening. A filter is positioned within the housing and adjacent the cover. The filter has an aperture structured to enable the gas to vent from the housing and to deter solid material housed within the housing from exiting the opening when the threshold pressure is satisfied.

22 Claims, 18 Drawing Sheets

(56) References Cited

U.S. PATENT DOCUMENTS

| | | | |
|---|---|---|---|
| 2009/0111003 A1 | 4/2009 | Kim et al. | |
| 2009/0274949 A1* | 11/2009 | Meguro | H01M 2/02 |
| | | | 429/56 |
| 2012/0196163 A1* | 8/2012 | Shimizu | H01M 2/12 |
| | | | 429/57 |
| 2017/0110699 A1 | 4/2017 | Kohira et al. | |

* cited by examiner

BATTERIES HAVING VENTS

FIELD OF THE DISCLOSURE

The present disclosure relates to batteries and, more particularly, to batteries having vents.

BACKGROUND

Electrochemical cells, or batteries may be used as electrical energy sources. In some examples, batteries are used to power electronic devices.

SUMMARY

In accordance with a first example, a battery includes a housing, including: a first terminal and a second terminal. The first terminal includes a cover. The cover includes at least one line of weakness therein. The line of weakness is structured to form an opening when a threshold pressure is satisfied within the housing to enable gas to vent from the housing through the opening. A filter is positioned within the housing and adjacent the cover. The filter has an aperture structured to enable the gas to vent from the housing and to deter solid material housed within the housing from exiting the opening when the threshold pressure is satisfied. In one refinement, the filter may be positioned immediately adjacent to the cover such that no other components are disposed between the cover and the filter.

In accordance with a second example, a battery includes a housing including: a first terminal and a second terminal. The first terminal has a cover including means for enabling gas to vent from the housing when a threshold pressure is satisfied. Means for enabling solid material to remain housed within the housing when the threshold pressure is satisfied. In one refinement, the means for enabling solid material to remain housed within the housing when the threshold pressure is satisfied may be positioned immediately adjacent to the cover such that no other components are disposed between the cover and the means for enabling solid material to remain housed within the housing when the threshold pressure is satisfied.

In accordance with a third example, a battery includes a housing, including a first terminal and a second terminal. The first terminal including a cover having a pressure release. The pressure release is actuatable to enable gas to vent from the housing when a threshold pressure is satisfied. A filter is positioned within the housing and adjacent the cover. The filter is structured to enable the gas to vent from the housing and to deter solid material housed within the housing from exiting the housing. In one refinement, the filter may be positioned immediately adjacent to the cover such that no other components are disposed between the cover and the filter.

In accordance with a fourth example, a battery, includes a housing including: a positive terminal; and a negative terminal, the positive terminal including an outermost cover including both a pip and a line of weakness adjacent the pip, the line of weakness structured to form an opening when a threshold pressure within the housing is satisfied.

In further accordance with the foregoing first, second, third and/or fourth examples, an apparatus and/or method may further include any one or more of the following:

In accordance with one example, the housing houses an anode and a cathode, and a separator is disposed between the anode and the cathode.

In accordance with another example, the housing includes a first space to accommodate anode expansion and a second space to accommodate cathode expansion.

In accordance with another example, the line of weakness is a score.

In accordance with another example, the score is positioned adjacent a sidewall of the housing and is at least partially covered by a label to further deter the solid material housed within the housing from exiting the opening when the threshold pressure is satisfied.

In accordance with another example, the score is longitudinally spaced from the cathode such that the score and the cathode are not aligned along a vertical axis of the battery.

In accordance with another example, the score includes an arc having a central portion adjacent the sidewall.

In accordance with another example, the line of weakness is approximately 8 millimeters long.

In accordance with another example, the aperture of the filter and the line of weakness of the cover are substantially aligned to enable the gas to pass through the aperture and to act on the cover to enable the line of weakness to form the opening when the threshold pressure is satisfied.

In accordance with another example, the filter is structured and arranged to reinforce the cover, for example, by retaining at least a portion of the solid material housed within the housing and thereby deterring the portion of the solid material from exiting the opening when the threshold pressure is satisfied.

In accordance with another example, the line of weakness is a first line of weakness and the opening is a first opening, the cover further including a second line of weakness, the second line of weakness structured to form a second opening to enable the gas to vent from the housing when the threshold pressure is satisfied.

In accordance with a refinement of the foregoing example, the cover includes a protrusion, the first line of weakness being disposed on a first side of the protrusion, the second line of weakness being disposed on a second side of the protrusion.

In accordance with another example, the filter includes a plurality of radially spaced apertures, the plurality of radially spaced apertures being structured to enable the gas to vent from the housing and to deter the solid material housed within the housing from exiting the opening when the threshold pressure is satisfied.

In accordance with another example, the first terminal is an anode and the second terminal is a cathode.

In accordance with another example, the battery further includes a second cover that covers the line of weakness.

In accordance with another example, the line of weakness is a coin vent.

In accordance with another example, the means for enabling the gas to vent from the housing when the threshold pressure is satisfied includes a line of weakness structured to form an opening when the threshold pressure is satisfied.

In accordance with another example, the line of weakness is an arch-shaped groove.

In accordance with another example, the means for enabling the solid material to remain housed within the housing when the threshold pressure is satisfied includes a filter positioned within the housing and adjacent the cover, the filter having a plurality of radially spaced apertures structured to enable the gas to vent from the housing and to deter solid material housed within the housing from exiting the opening when the threshold pressure is satisfied.

In accordance with another example, the pressure release includes a line of weakness that is structured to sever when a threshold pressure is satisfied to form an opening to enable the gas to vent.

DETAILED DESCRIPTION

Figure 1:
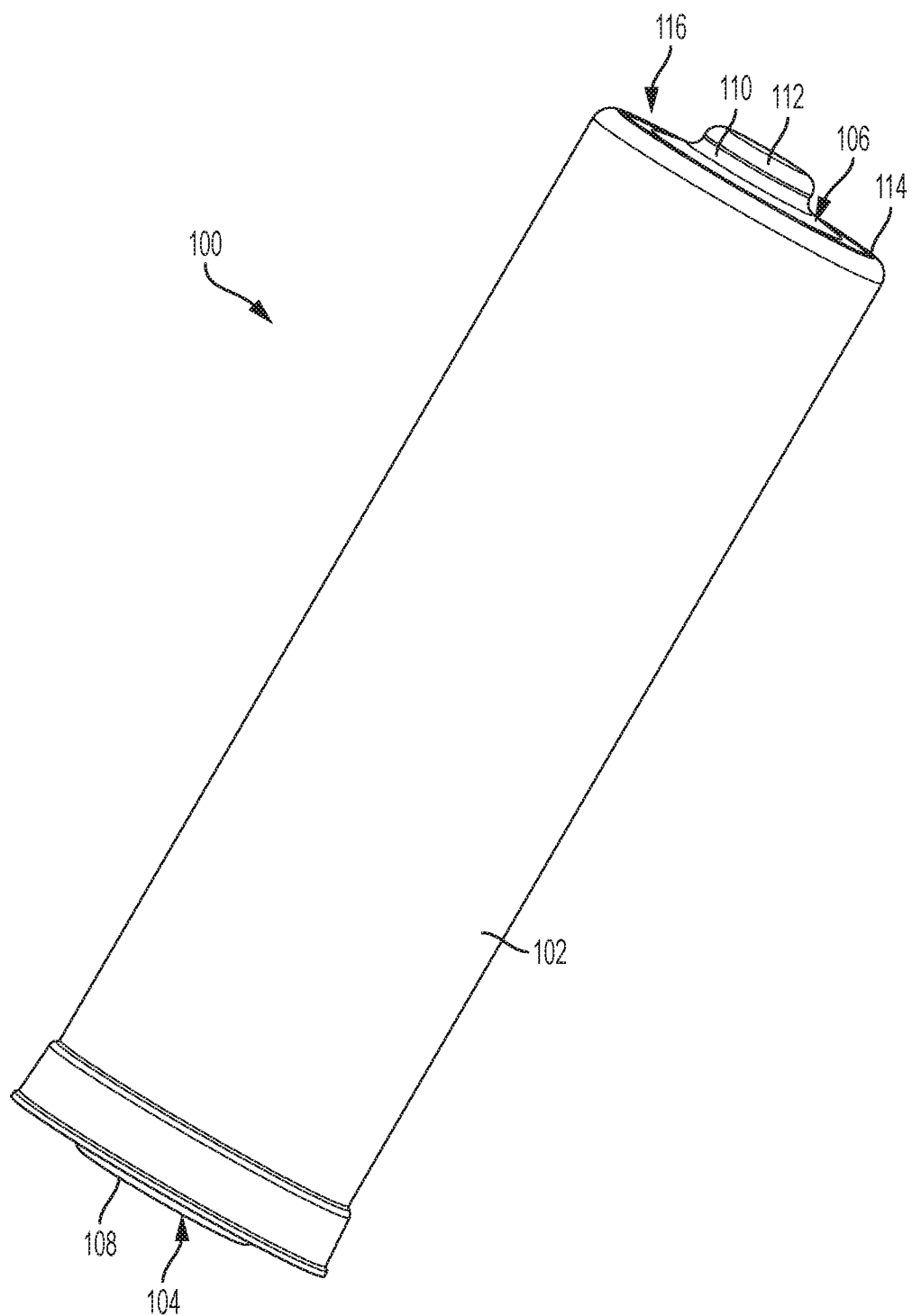
FIG. 1 illustrates an example battery in accordance with the teachings of this disclosure.

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Chemical reactions between components of batteries such as, alkaline batteries or lithium batteries, may generate gas and/or may create products that increase the volume of material housed within the batteries. To reduce the internal pressure within the batteries in a controlled manner after a threshold pressure is satisfied, the examples disclosed herein include an example pressure release that is structured to enable the pressure to vent. The threshold pressure may be, for example, a pressure between about 1000 pounds per square inch (psi) and about 2000 psi, or approximately 1400 psi or any other selected pressure. Advantageously, the example pressure releases implemented in accordance with the teachings of this disclosure take up less internal space within the battery housing to enable the internally-available volume of the battery elements (such as the anode and the cathode) to increase by approximately five percent as compared to other known examples. Specifically, because the seal at the end of the battery does not include an internal safety vent, the space typically occupied by the internal safety vent is not required, enabling a space savings within the battery cavity. Further in contrast to pressure releases that are implemented by plastic seals of some known batteries, the pressure releases may be structured to not degrade over time even if exposed to hydroxide, temperatures outside of a threshold range and/or humidity outside of a threshold range.

The example pressure releases can be implemented as one or more lines of weakness formed in a cover of the battery. The lines of weakness may have any length. However, in some examples, the respective lines of weakness are approximately eight millimeters (mm) long. Regardless of the length or the position of the lines of weakness, the lines of weakness are structured to form an opening when a threshold pressure is satisfied but substantially seal the battery and enclose the components contained therein at lower pressures. Put another way, when the threshold pressure is satisfied, the example lines of weakness break or tear enabling tabs defined by the lines of weakness to move and form openings that enable excess pressure to vent in a controlled manner and that deter solid material from exiting the opening.

The lines of weakness may be formed as one or more grooves, scores and/or coin vents that at least partially surround the pip on the cover of the terminal. As set forth herein, the term "score" refers to a mark, scratch, incision, laser etching/engraving, and/or thinned section relative to surrounding sections. As set forth herein, the phrase "coin vent" means areas of reduced material thickness that are structured and arranged to fracture in response to a pressure satisfying a threshold pressure. In some examples, the lines of weakness are positioned over the cathode when the cover is coupled at an end of the battery, for example, to space the openings formed at the line of weakness from mechanical pressure potentially exerted by the anode and/or to deter the openings formed at the line of weakness from being blocked or clogged by the separator and/or the anode when a venting event occurs.

In some examples, the lines of weakness include one or more arc-shaped lines of weakness and/or radial lines of weaknesses coupled at the ends of the respective arch-shaped lines of weakness. When the line of weakness is implemented as a single arc-shaped groove, the single arc-shaped groove may be between about a 70° arc and 270° arc (relative to the circumference of the cover) or otherwise have a C-shape. Of course, a 360° circle is to be avoided as this may result in solid material (initially housed in the housing) being expelled from the housing. In such examples, the single arc-shaped groove may be offset from a rotational symmetric axis of the battery to enable a central portion of the arc-shaped groove to be adjacent an interface between the cover and the sidewall of the battery housing and to enable ends of the arc-shaped groove to end adjacent a cathode area of the battery without passing over or significantly extending across an anode area of the battery. Positioning the central portion of the arc-shaped groove adjacent the interface enables the central portion to be spaced from the anode and can thereby deter the anode from reducing a flow rate of gas exiting the opening, for example, by preventing/reducing clogging of the opening by anode material.

In other examples, the line of weakness includes two arc-shaped grooves. The two arc-shaped grooves can be symmetric about a rotational symmetric axis that extends through the positive pip. In some such examples, the arc-shaped grooves are formed as semi-circles. While different examples of how the lines of weaknesses may be implemented are disclosed above, the lines of weakness may have any shape and/or may be positioned in any location to enable the pressure to be reduced when a venting event occurs. Furthermore, the lines of weakness may be formed in any suitable way. For example, the lines of weakness may be formed using a laser or another engraving tool.

To enable gas to exit an opening formed at the line of weakness while deterring solid material from exiting the opening, in some examples, the batteries include an example filter disposed between the anode/separator/cathode assembly and the cover, the filter being disposed adjacent the cover. Specifically, the filter is structured to enable the passage of gas and/or liquid through the filter and is structured to deter the passage of solid through the filter. The filter may reinforce the cover and may be formed of metal phase or another material that is resilient under both normal battery operating conditions and conditions requiring the battery to vent. For example, the filter may be formed of stainless steel and/or another material that has a tendency to not fatigue.

In some examples, the filter is formed of a spacer having example apertures and/or perforations that are sized and/or structured to deter material from passing through the apertures. The spacer may be formed as a disc, such as a gas permeable disc, a washer, a barrier and/or a mesh. The example spacer may have any number of apertures including, for example, three apertures, four apertures, eight apertures, nine apertures and/or sixteen apertures.

To enable gas passing through the apertures to act on the lines of weakness, in some examples, the apertures can be aligned with the lines of weakness when the cover is coupled at the end of the battery. The apertures may be positioned and/or radially spaced about the spacer to enable the apertures to be positioned adjacent the positive cover and/or the cathode of the battery. As set forth herein, the apertures are considered aligned with a line of weakness when gas that passes through the apertures acts on the line of weakness to encourage the line of weakness to tear and form the opening when the threshold pressure within the battery is satisfied and/or when gas that passes through the apertures is diverted out of the opening formed by the tabs in the open position. In another aspect, the apertures are considered aligned when a point on the line of weakness is axially aligned with the apertures. While the above example mentions the filter being formed of a part having apertures, in other examples, the filter may be formed of a porous mesh (e.g., a stainless steel porous mesh) that is structured to reinforce the anode/separator/cathode assembly and enable gas permeability.

In some examples, to further deter material from exiting the opening when formed, the line of weakness is curved and includes a central portion that is adjacent a sidewall of the housing (e.g., the can) and at least partially covered by an example cover (e.g., a wrapper, a label). By at least partially covering the line of weakness with the cover, if the line of weakness breaks to enable the associated tab to move away from the sidewall of the housing to form an opening, the label covers or stretches across the opening and/or deters material (e.g., non-gaseous material, non-liquid material) from exiting the opening but provides pathways sufficient for any vented gas to escape the housing.

FIG. 1 illustrates an example battery 100 that can be used to implement the teachings of this disclosure. In the illustrated example, the battery 100 includes an example housing 102 having a cylindrical shape and example first and second terminals 104, 106 having example first and second covers 108, 110, where the second cover 110 is shown integrally formed with the housing 102. While the battery 100 of FIG. 1 is depicted in a cylindrical form with a circular cross-section, the example covers including a line of weakness structured to form an opening when a threshold pressure is satisfied, means for enabling gas to vent from the housing when a threshold pressure is satisfied, pressure releases actuatable to enable gas to vent from the housing when a threshold pressure is satisfied, filters having an aperture structured to enable the gas to vent from the housing and to deter material housed within the housing from exiting the opening when the threshold pressure is satisfied, means for enabling material to remain housed within the housing when the threshold pressure is satisfied, and filters structured to enable the gas to vent from the housing and to deter material housed within the housing from exiting the housing disclosed herein can be implemented in different battery forms such as, for example, batteries having a rectangular cross-section or a square cross-section. Thus, the teachings of the present application may be applied to batteries including but not limited to AAAA, AAA battery, a AA battery, a B battery, a C battery, a D battery, a 9V battery, a CR2 battery, a CR123A battery, a ⅓N battery and relatively flat forms such as, for example, button cells and coin cells.

In the illustrated example, the first terminal 104 is a negative terminal, the second terminal 106 is a positive terminal and the second cover 110 includes a positive pip or protrusion 112 that extends from an end 114 of the battery 100. Additionally, the battery 100 of FIG. 1 includes an example pressure release 116 that is structured to form an opening when a threshold pressure within the battery 100 is satisfied. In some examples, the pressure release 116 is formed by one or more lines of weakness that are structured to sever and/or rupture when a pressure event occurs. While FIG. 1 discloses the second cover 110 including the pressure release 116, in other examples, the pressure release 116 can be provided at the first cover 108.

Figure 2:
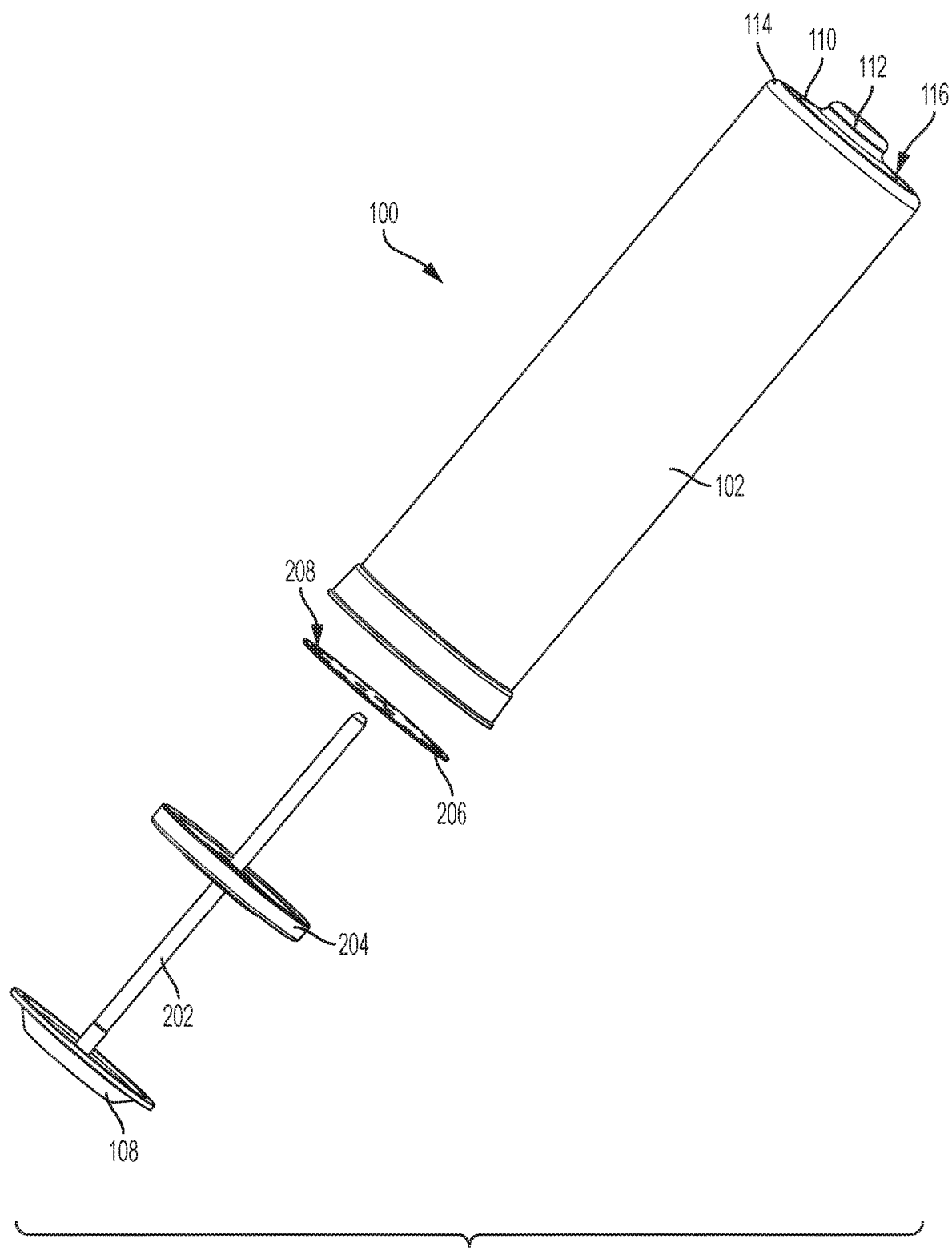
FIG. 2 illustrates an exploded isometric view of the battery of FIG. 1.
Figure 3:
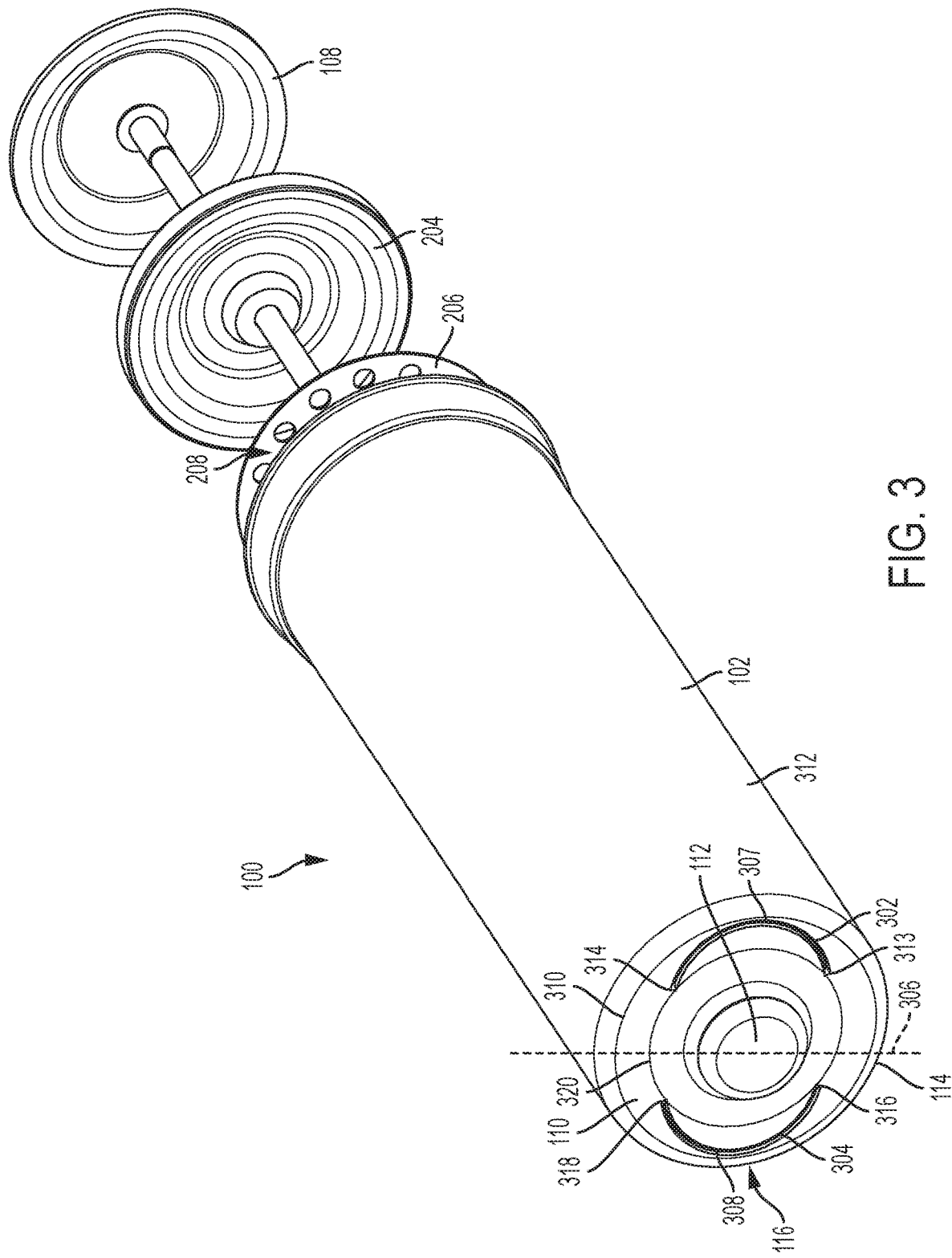
FIG. 3 illustrates another exploded isometric view of the battery of FIG. 1.
Figure 4:
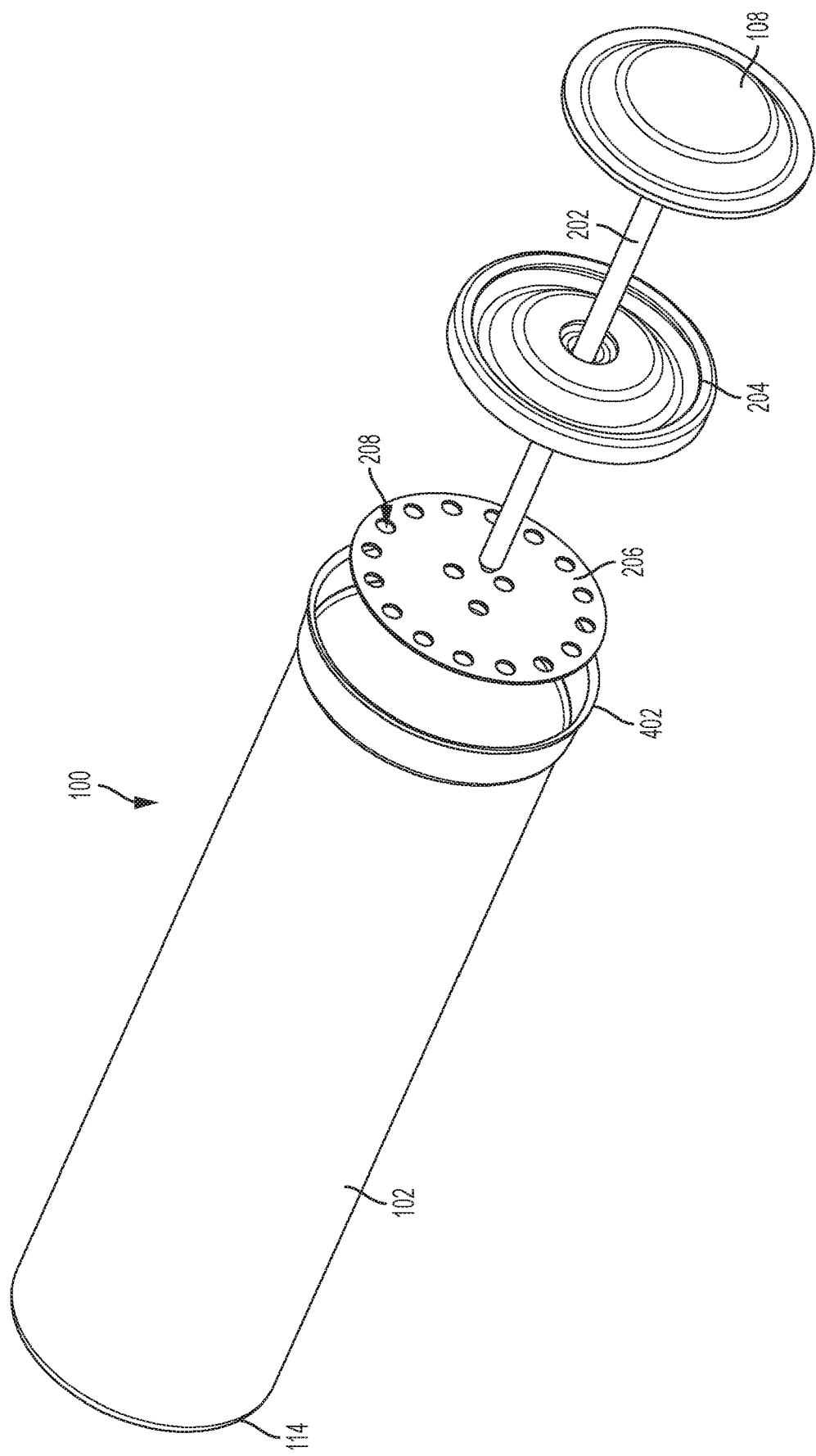
FIG. 4 illustrates another exploded isometric view of the battery of FIG. 1.

FIGS. 2-4 illustrate different exploded isometric views of the example battery 100 of FIG. 1. Referring to FIG. 2, the battery 100 includes the housing 102, the first cover 108, an example anode current collector 202 and an example seal 204. As shown and in contrast to other known examples, the seal 204 of FIG. 2 does not include a vent enabling the seal 204 to be made smaller and/or have less height. Because the seal 204 is smaller and/or has less height as compared to some known examples, the seal 204 can be positioned closer to the first cover 108 and/or can occupy less space within the housing 102. As a result, the example battery 100 includes approximately four to five percent more space available to house other components of the battery 100 (e.g., anode, cathode, separator) as compared to other examples. Moreover, prior known examples include plastic vents formed by lines of weakness and implemented by a seal such as the seal 204. The lines of weakness were structured to break under certain conditions to controllably vent the battery. However, because the seals 204 are made of plastic and plastic has a tendency to fatigue under certain environmental conditions, this line of weakness also had tendency to fatigue/form a vent opening when exposed to increased temperatures and/or humidity. In contrast to prior known examples, the seal 204 used to implement the examples disclosed herein does not include a vent and, thus, does not include a line of weakness structured to form a vent under certain conditions. Without the inclusion of such a vent/line of weakness in the seal 204, the useful life of the seal 204 and the useful of the battery 100 is advantageously increased.

To enable gas to exit the battery 100 and to deter non-gaseous material from exiting the battery 100 when an opening is formed at the pressure release 116, in this example, the battery 100 includes an example filter 206 having example apertures 208. The filter 206 may be formed of metal such as, stainless steel, plastic or any other suitably rigid material and may be referred to herein as a disc, a shim, a mesh, a screen, etc. The apertures 208 may be positioned adjacent the pressure release 116 when the filter 206 is positioned within the housing 102. Thus, the apertures 208 may be radially spaced and may be positioned along an imaginary arc or circle that follows and/or substantially corresponds to the pressure release 116.

FIG. 3 illustrates the end 114 of the battery 100 including the pressure release 116. In this example, the pressure release 116 is implemented as an example first arc-shaped line of weakness 302 and an example second arc-shaped line of weakness 304, where the lines of weakness 302, 304 are substantially symmetric across a transverse axis 306 of the second cover 110. As shown, the lines of weakness 302, 304 have middle portions 307, 308 that are positioned adjacent an interface 310 between a sidewall 312 of the housing 102 and the second cover 110. As also shown, ends 313, 314, 316, 318 of the lines of weakness 302, 304 terminate at approximately a beginning 320 of the pip 112. As set forth herein, the beginning 320 of the pip is defined as an annular portion of the second cover 110 that begins to protrude outwardly to ultimately provide the pip 112 itself.

Positioning the middle portions 307, 308 next to the interface 310 enables any resultant opening (see FIGS. 11, 12) to be spaced from the anode when a threshold pressure has been satisfied. Positioning the middle portions 307, 308 next to the interface 310 also enables a label 1000 (FIG. 10) to cover the lines of weakness 302, 304 to further deter any solid material from exiting the battery 100 during a pressure-equalization event. While the battery 100 is shown including two of the lines of weakness 302, 304 in a particular location and having a particular shape, any number of lines of weakness may be included (e.g., 1, 3, 4, etc.) in any location that enables pressure within the battery 100 to equalize in a controlled manner.

FIG. 4 illustrates a second end 402 of the housing 102, the filter 206, the anode current collector 202, the seal 204 and the first cover 108. As shown, sixteen circular apertures 208 are radially spaced about the filter 206 and three of the apertures 208 are centrally disposed on the filter 206 and form corners of an imaginary triangle. However, the filter 206 may include any number of apertures that are positioned in any location and/or have any cross-section (e.g., square, oval, triangle, rectangle, hexagon, etc.) that enables pressure within the battery 100 to equalize in a controlled manner.

Figure 5:
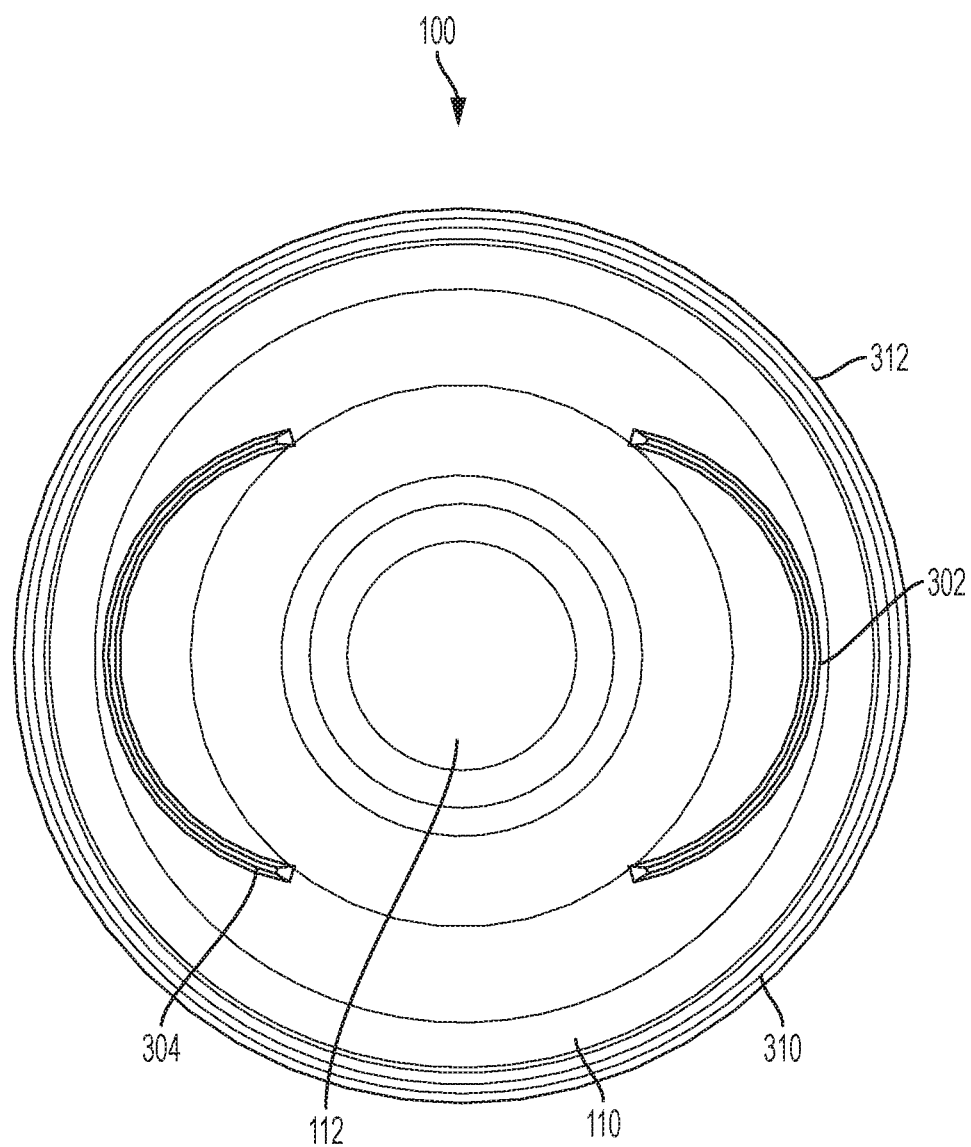
FIG. 5 illustrates an end view of the example battery of FIG. 1 showing the positive cover including an example pressure release in a closed position.

FIG. 5 illustrates a plan view of the battery 100 including the pip 112, the lines of weakness 302, 304 and the interface 310 between the sidewall 312 and the second cover 110.

Figure 6:
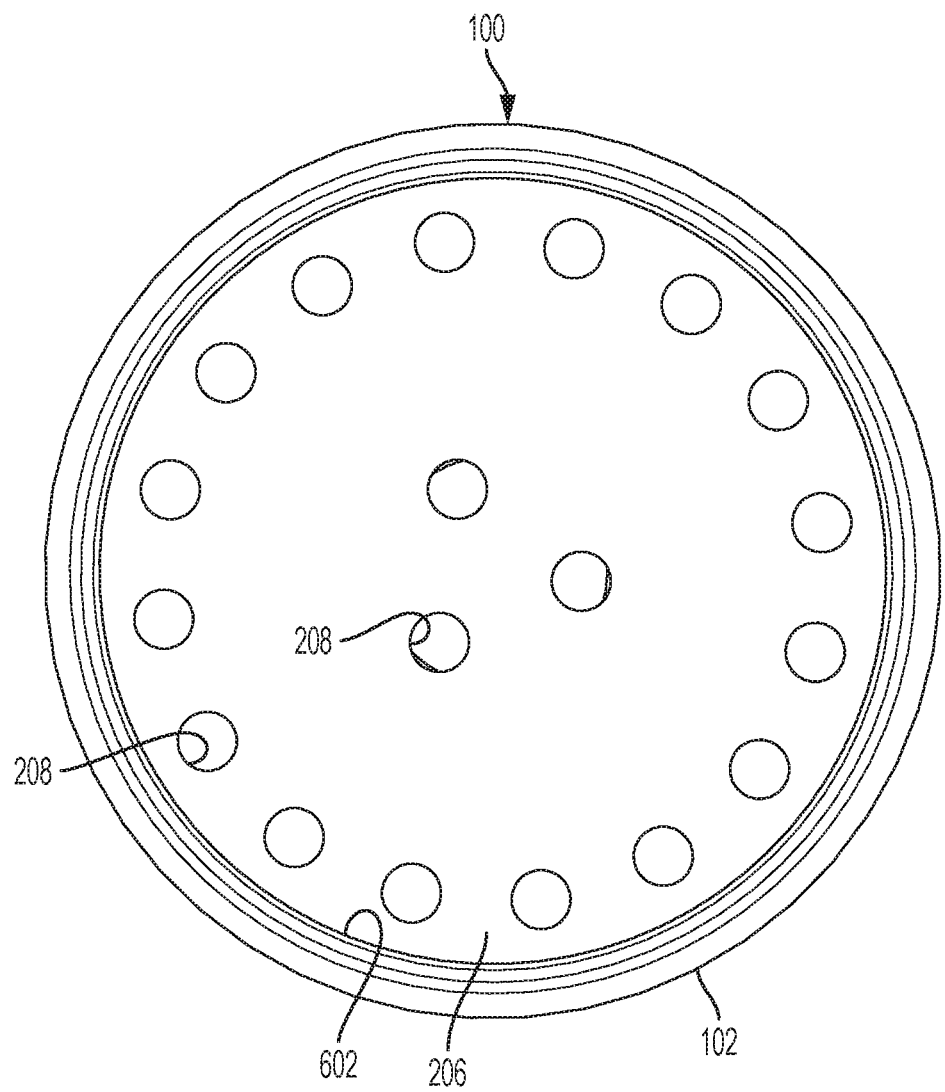
FIG. 6 illustrates an example filter having example apertures disposed within a housing of the battery of FIG. 1.

FIG. 6 illustrates a plan view of the filter 206 disposed in the housing 102. As shown, the example apertures 208 are positioned adjacent an outer edge 602 of the filter 206 to enable any gas passing through the apertures 208 to act on the lines of weakness 302, 304 and/or to deter any of the anode (802; see FIG. 8) when in an expanded state after being subjected to increased pressure within the housing 102 from clogging the apertures 208 and changing (e.g., preventing, reducing) a fluid flow rate through the apertures 208. FIG. 6 also illustrates some of the apertures 208 disposed toward the middle of the filter 206. In this example, the centrally disposed apertures 208 enable conductivity between electrolyte accumulated within the pip 112 and electrolyte within the remainder of the battery 100.

Figure 7:
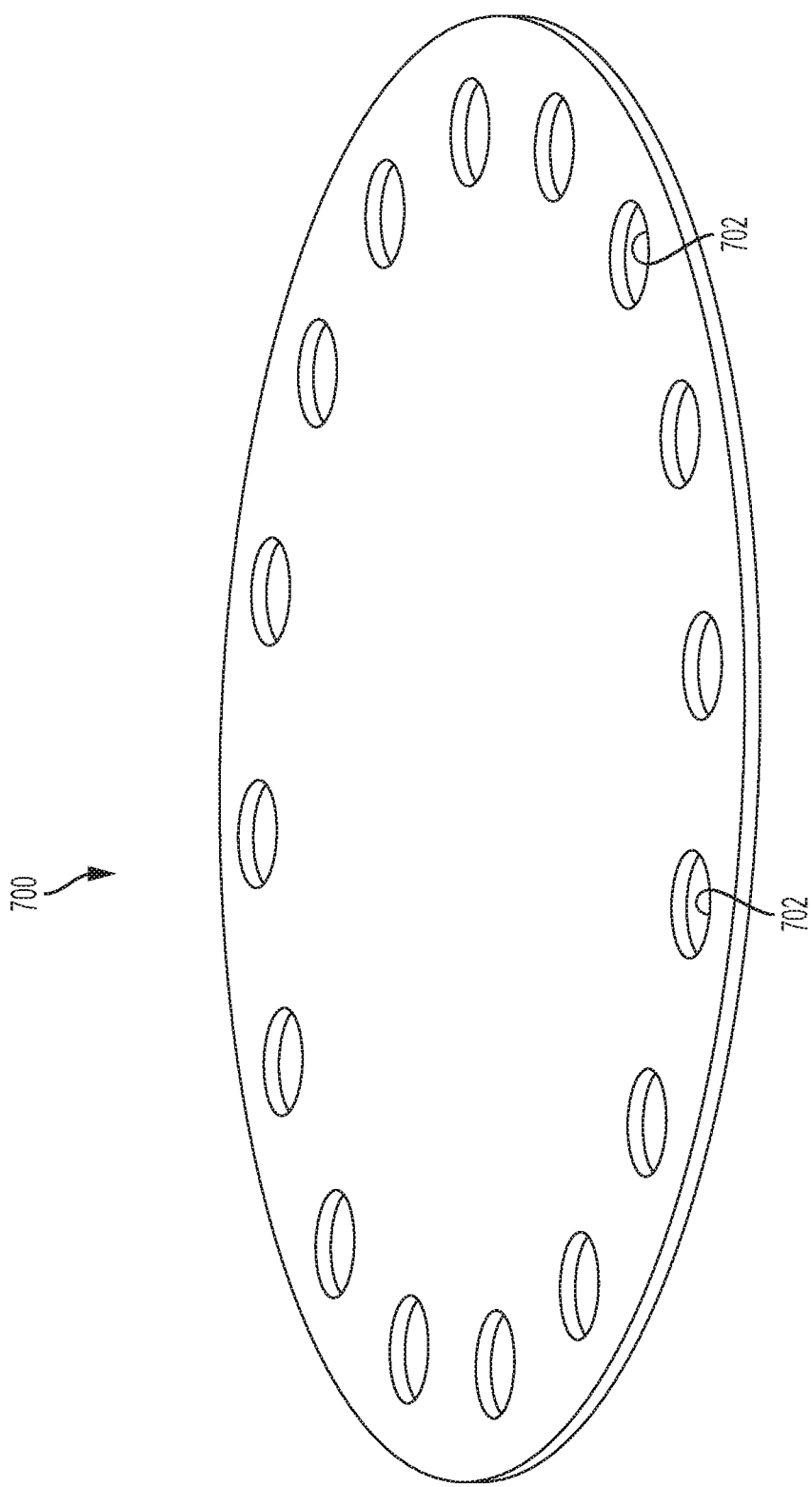
FIG. 7 illustrates another example filter that can be used to implement the battery of FIG. 1.

FIG. 7 illustrates another example filter 700 that can be used to implement the battery 100 of FIG. 1. In contrast to the filter 206 of FIG. 6, the filter 700 of FIG. 7 does not include apertures that are centrally disposed. Instead, the filter 700 includes sixteen apertures 702 that are radially spaced and disposed about an imaginary circle having a contour that is associated and/or aligned with the contour of the lines of weakness 303, 304.

Figure 8:
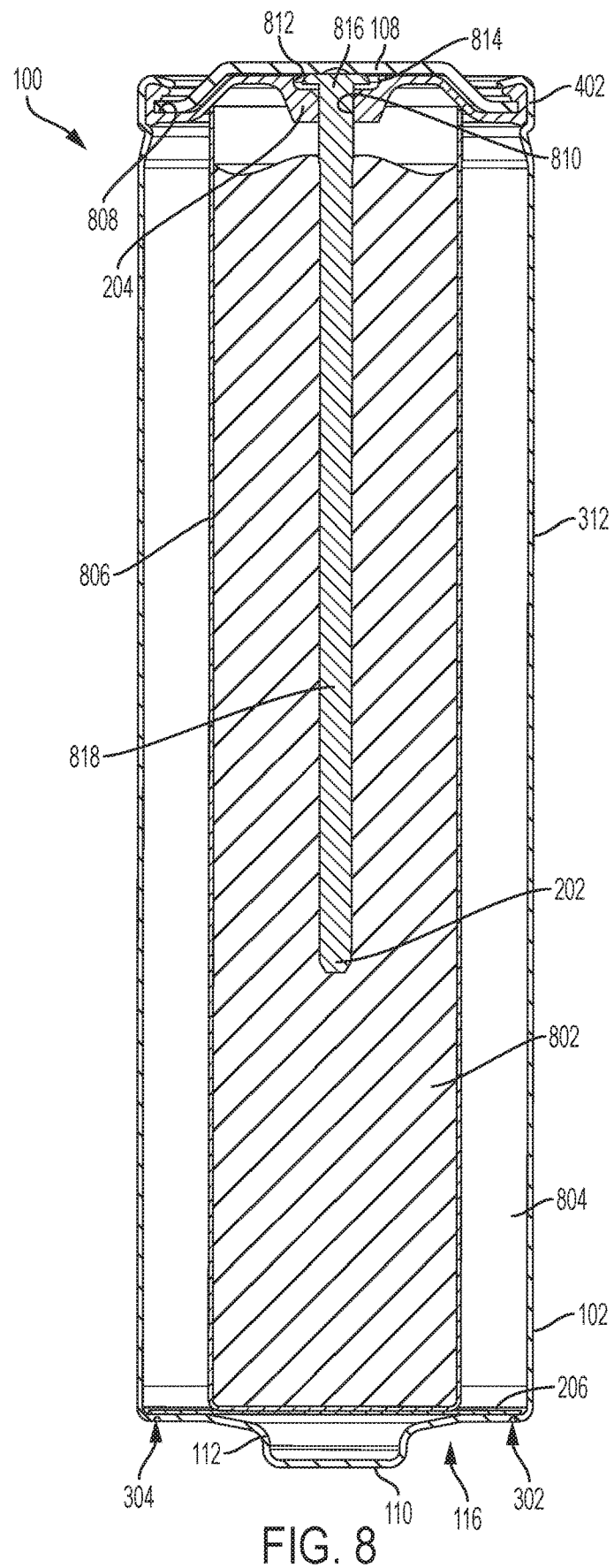
FIG. 8 illustrates a cross-sectional elevated view of the battery of FIG. 1.

FIG. 8 illustrates a cross-sectional elevated view of the battery 100 of FIG. 1. As shown, the battery 100 includes the first and second covers 108, 110, with the housing 102 generally being disposed therebetween. To separate an anode 802 from a cathode 804, the battery 100 includes an example separator 806. To close the second end 402 after the components of the battery 100 such as the anode 802, the cathode 804 and the separator 806 are disposed within the housing 102, the first cover 108 is received within a groove 808 of the seal 204 and the sidewall 312 of the housing 102 is crimped over a peripheral edge of the seal 204. In some examples, the seal 204 is spaced equal to or greater than 3 mm from the cathode 804 to enable the cathode 804 to expand. In some examples, the seal 204 is similarly spaced from the anode 802 to enable the anode 802 to expand.

To couple the anode current collector 202 and the first cover 108, in this example, the seal 204 includes a first aperture 810 and a second aperture 812 having an opening 814, where an end 816 of the anode current collector 202 is positioned within the second aperture 812 and coupled to the first cover 108 via, for example, a weld. In this example, a body 818 of the anode current collector 202 extends through the first aperture 810 and into the anode 802. In some examples, implementing the battery 100 with the seal 204 having the second aperture 812 that does not include its own vent enables the internal volume of the battery 100 that is usable to house chemicals or other battery components to increase by about four and five percent as compared to other known examples and/or enables the anode current collector 202 to be placed in an off-center position. For example, incorporating a vent into the seal 204 as some known batteries do may increase the size of the seal 204 and/or increase a distance that the seal 204 is spaced from the first cover 108.

Figure 9:
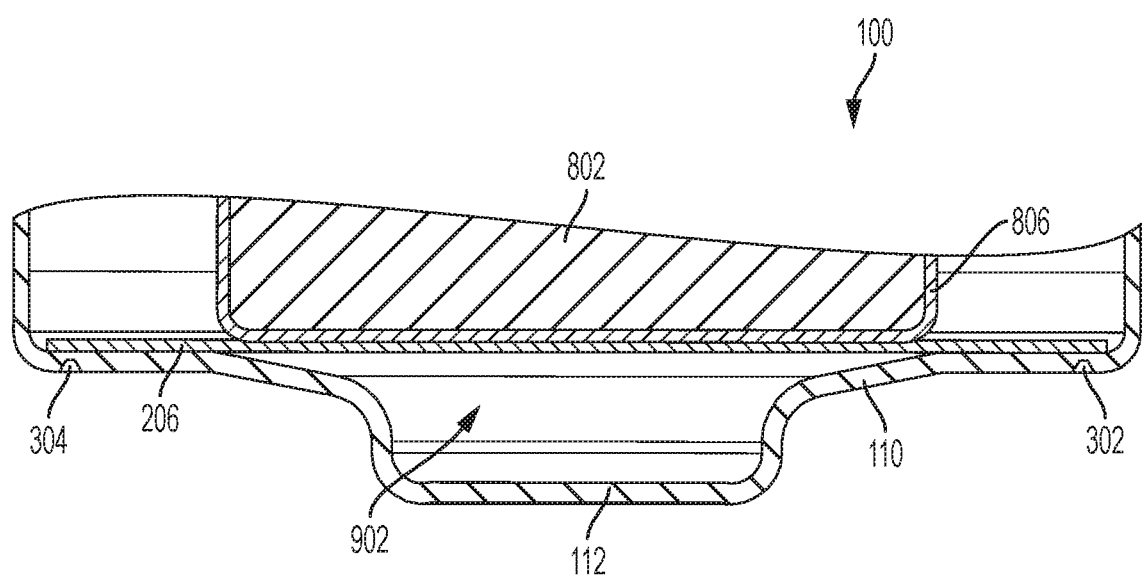
FIG. 9 illustrates a detailed cross-sectional elevated view of an end of the battery of FIG. 1.

FIG. 9 illustrates a detailed cross-sectional elevated view of the battery 100 showing the filter 206 engaging and/or being positioned adjacent the second cover 110 and the first and second lines of weakness 302, 304. FIG. 9 also shows a space 902 defined by the pip 112 that is sized and/or structured to accommodate expansion of the anode 802.

Figure 10:
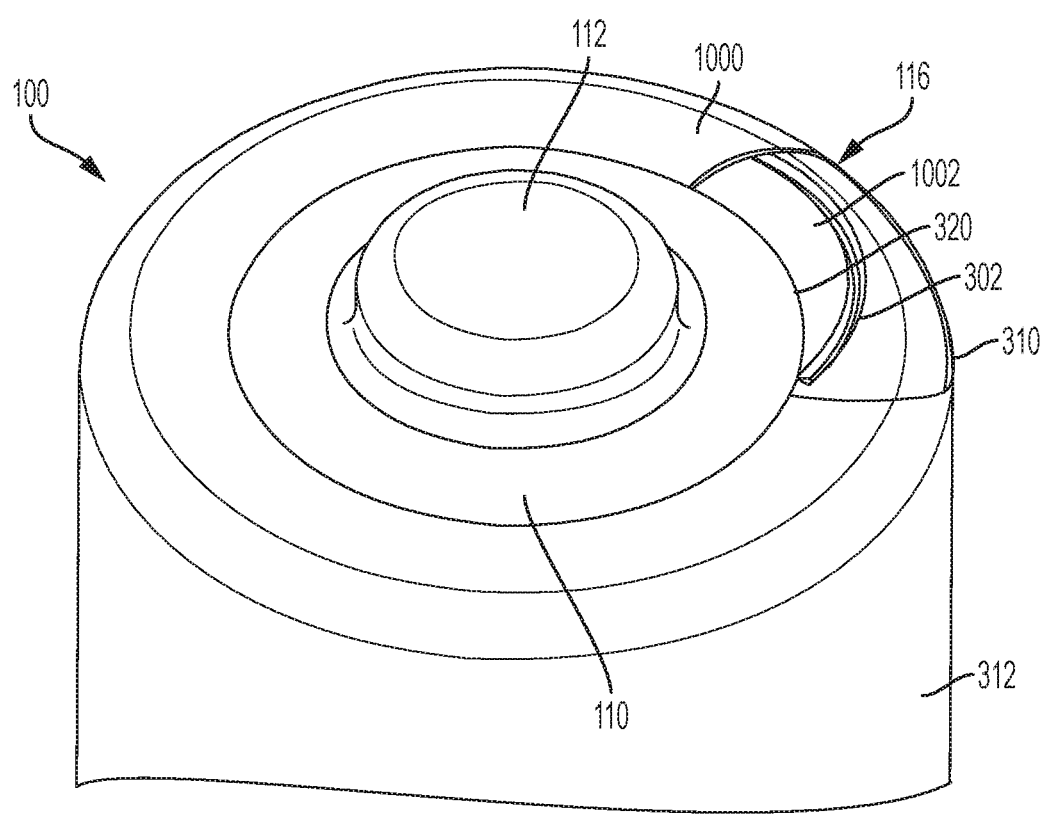
FIG. 10 illustrates an isometric cutaway view of the example battery of FIG. 1 including an example label sized to cover the example pressure release.

FIG. 10 illustrates an isometric view of the battery 100 including the label 1000 covering and/or overlaying the interface 310 between the second cover 110 and the sidewall 312 and covering and/or overlaying the lines of weakness 302, 304 or, more generally, the pressure release 116 in which the label 1000 is partially removed to better illustrate the battery 100. The label 1000 may be formed of any material such as metallized plastic, plastic, rubber, paper, plastic with a rubberized coating, combinations thereof, etc. Regardless of the material used to form the label 1000, the label 1000 may be structured to stretch to accommodate tabs 1002, moving from the closed position shown in FIG. 10 to an open position shown in FIG. 11. As shown, the tabs 1002 are associated with and defined by the lines of weakness 302, 304. By the label 1000 stretching and/or not tearing, the tabs 1002 can move to the open position to enable pressure across the second cover 110 to substantially equalize while deterring solid material (e.g., the anode 802, the cathode 804) from exiting any opening formed. In this example, the tabs 1002 are defined by the lines of weakness 302, 304 that fracture when the pressure within the battery 100 is satisfied enabling the tabs 1002 to move toward an open position.

Figure 11:
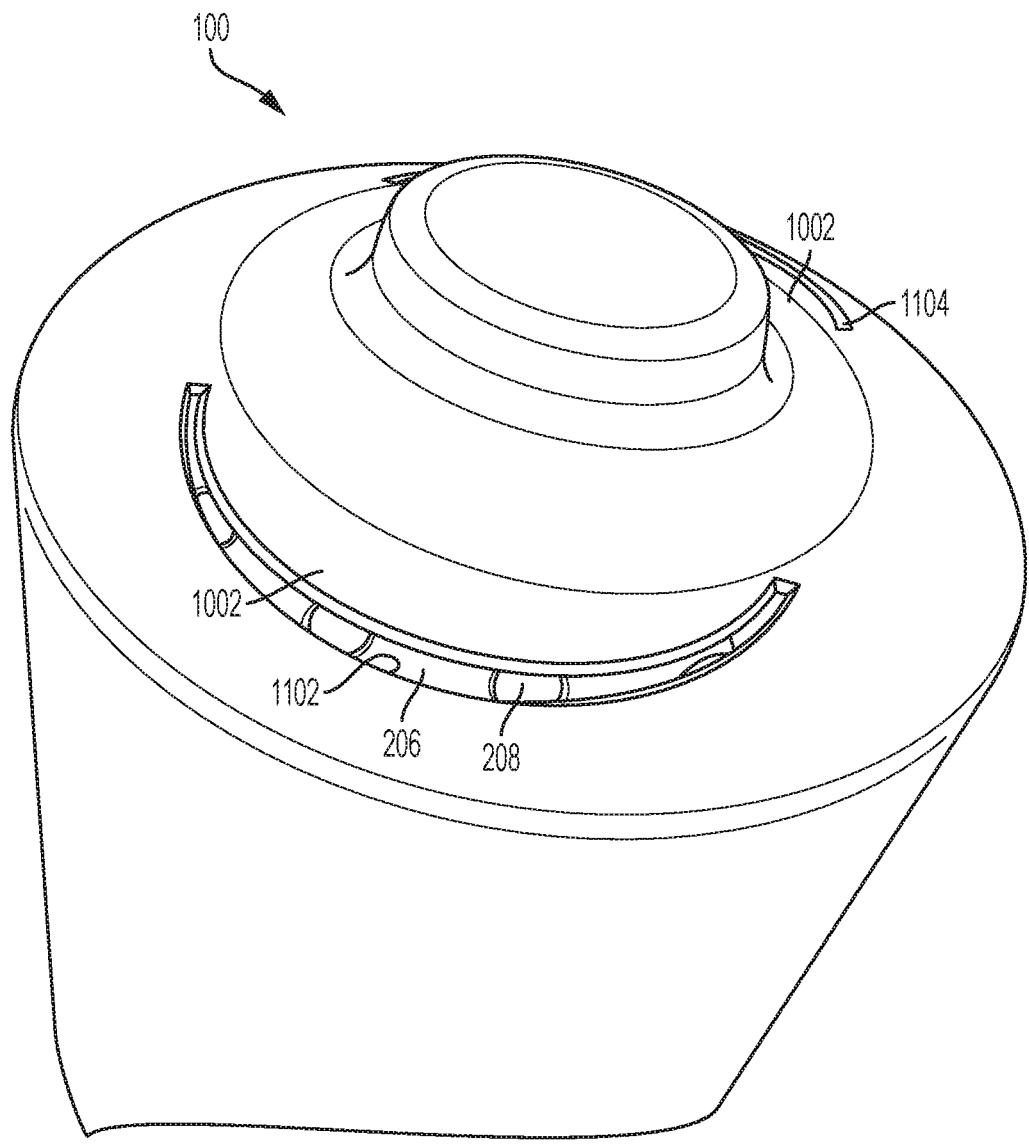
FIG. 11 illustrates an isometric view of the example battery of FIG. 1 illustrating the pressure release in an open position.

FIG. 11 illustrates the battery 100 during a pressure-equalization event, where the tabs 1002 outlined by the lines of weakness 302, 304 (FIG. 3) are actuated to form arc-shaped openings 1102, 1104. As shown, the apertures 208 of the filter 206 follow and/or are disposed along a contour of the openings 1102, 1104 to enable gas passing through the apertures 208 to act on the lines of weakness 302, 304 and/or to enable gas passing through the apertures 208 to easily vent from the battery 100 when the tabs 1002 are in the open position.

Figure 12:
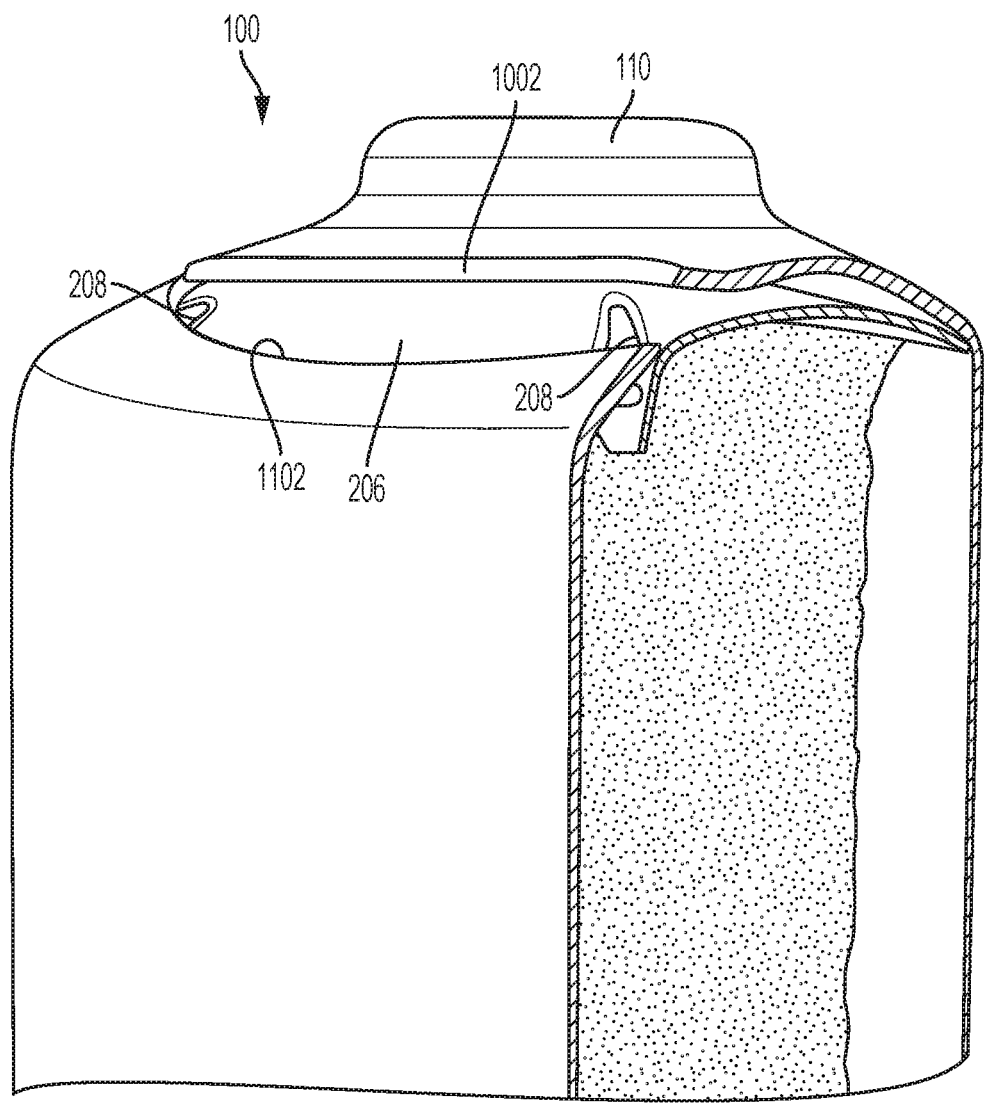
FIG. 12 illustrates an isometric partial cross-sectional view of the example battery of FIG. 11.

FIG. 12 illustrates an isometric partial cross-sectional view of the battery 100 with the tabs 1002 actuated to the open position and the apertures 208 aligned with and/or correlated with the opening 1102 to increase a speed at which pressure across the second cover 110 equalizes.

Figure 13:
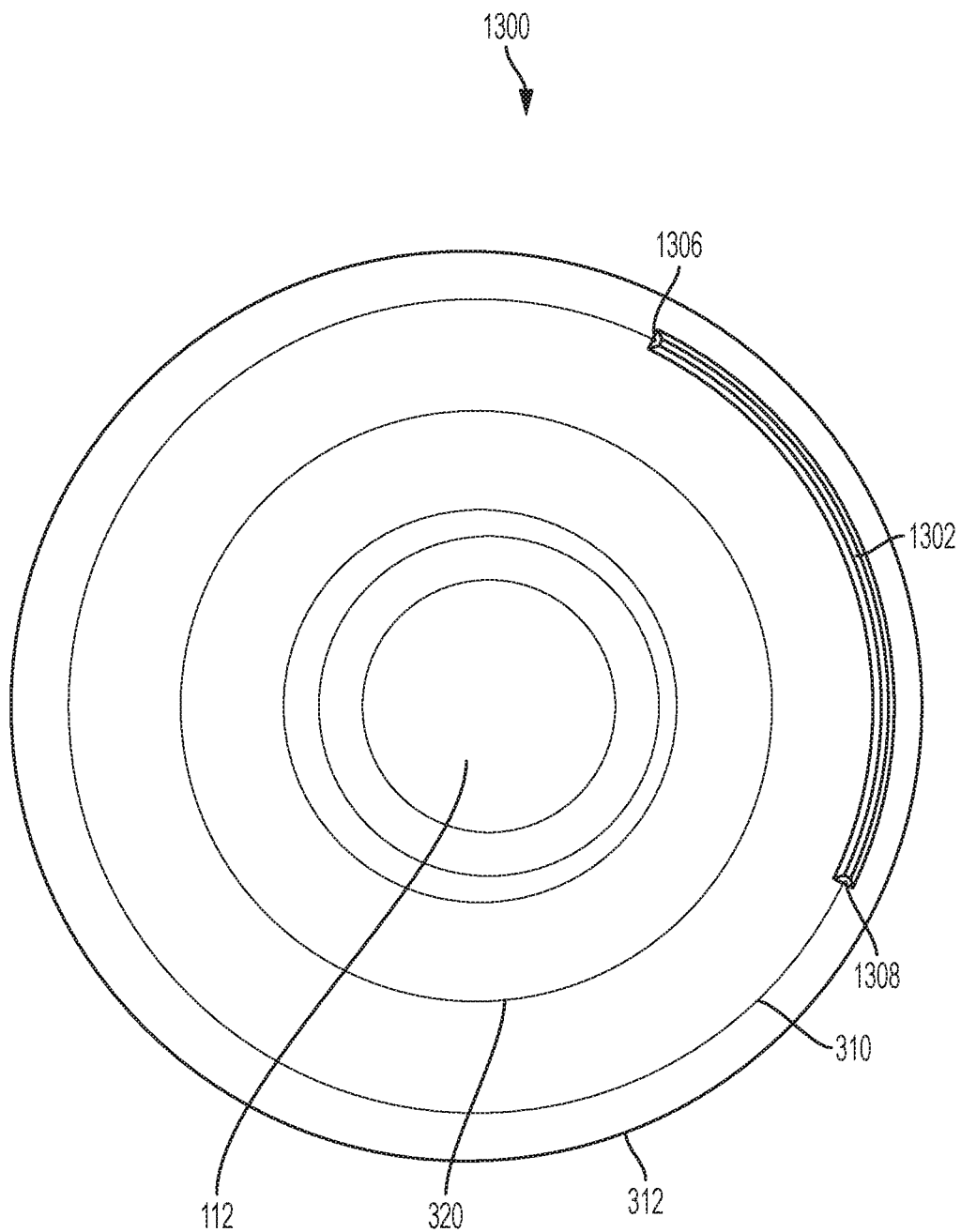
FIG. 13 illustrates another example cover including another example pressure release that can be used to implement the battery of FIG. 1.

FIG. 13 illustrates another example cover 1300 that can be used to implement the battery 100 of FIG. 1. In contrast to the second cover 110, the cover 1300 of FIG. 13 includes an example line of weakness 1302 that is provided with an arcuate shape that follows and/or is positioned adjacent to the interface 310 between the sidewall 312 and the cover 1300, where ends 1306, 1308 of the line of weakness 1302 do not extend toward the beginning 320 of the pip 112.

Figure 14:
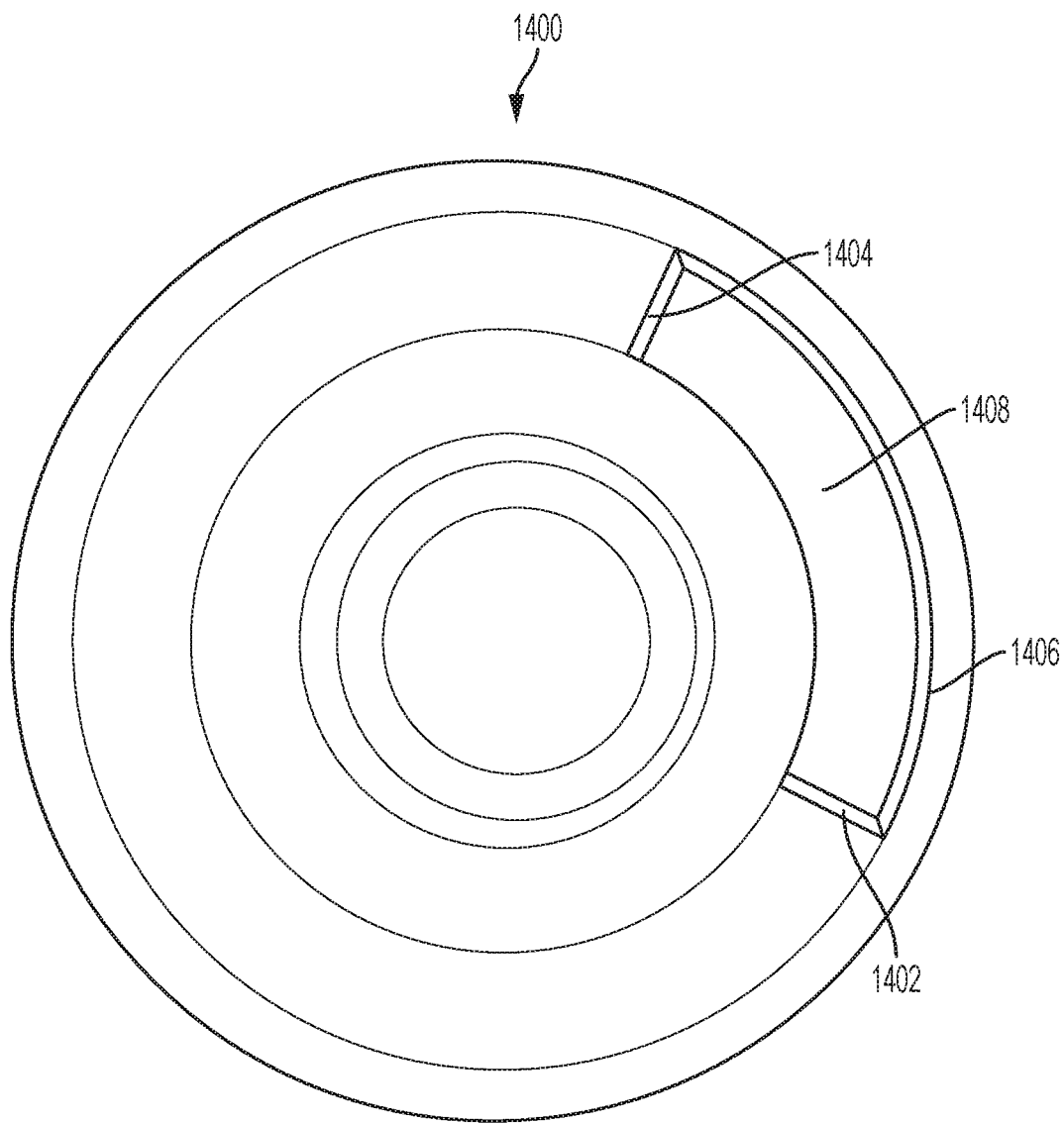
FIG. 14 illustrates another example cover including another example pressure release that can be used to implement the battery of FIG. 1.

FIG. 14 illustrates an example cover 1400 that is similar to the cover 1300 of FIG. 13 and that can be used to implement the battery 100 of FIG. 1. In contrast to the cover 1300 of FIG. 13, the cover 1400 of FIG. 14 includes example radially-extending lines of weakness 1402, 1404 that are coupled to respective ends of an example arc-shaped line of weakness 1406. In this example, the lines of weakness 1402, 1404, 1406 define a tab 1408 that is actuatable between different positions to change an amount of fluid flow through the cover 1400. For example, in a first and/or closed position, the tab 1408 is positioned to prevent gas from escaping from a battery implemented with the example cover 1400 and in a second and/or open position, the tab 1408 is positioned to enable gas to escape from such a battery. Because of the inclusion of the radially-extending lines of weakness 1402, 1404, an opening formed by the example cover 1400 may be larger than an opening formed by the cover 1300 of FIG. 13.

Figure 15:
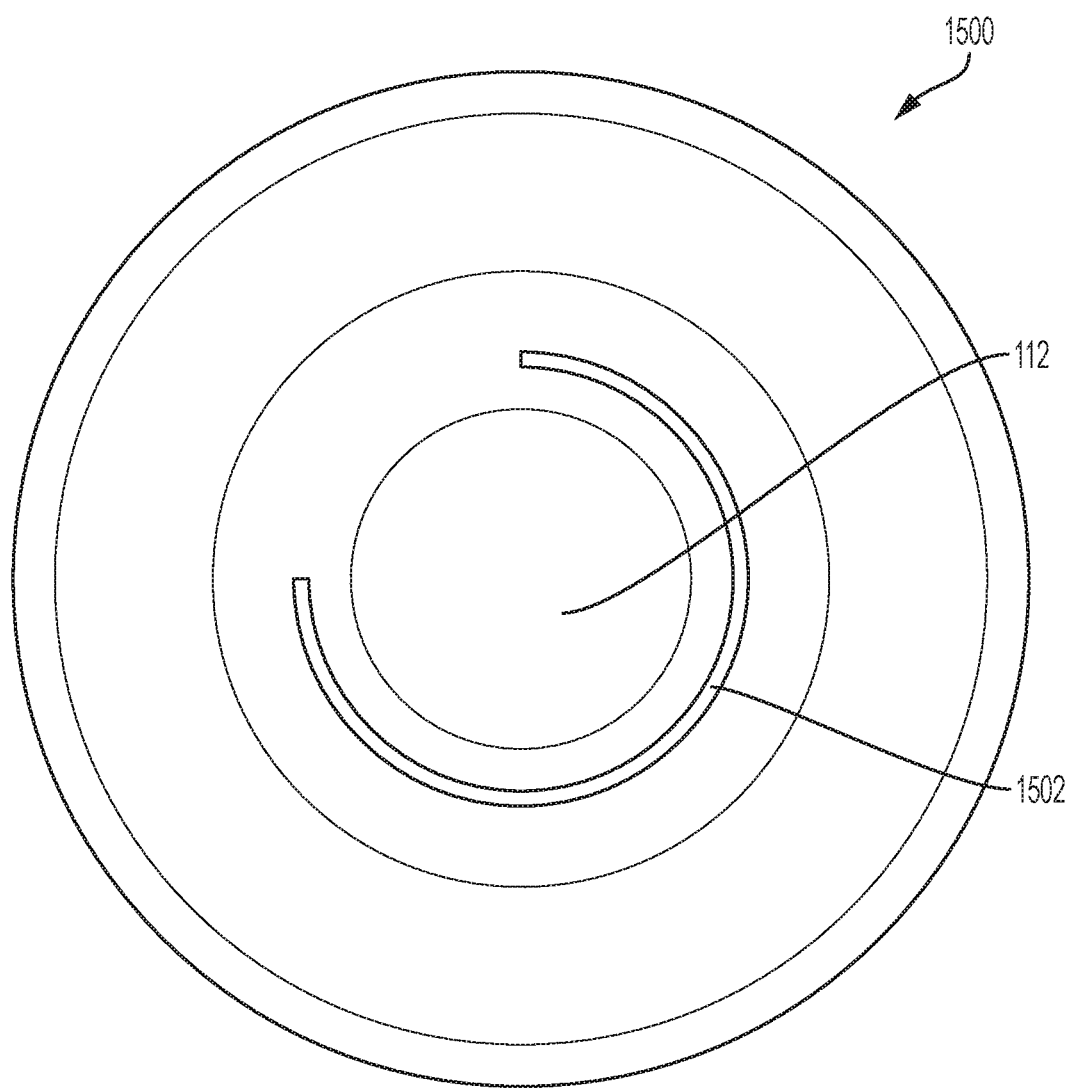
FIG. 15 illustrates another example cover including another example pressure release that can be used to implement the battery of FIG. 1.

FIG. 15 illustrates another example cover 1500 that can be used to implement the battery 100 of FIG. 1. In contrast to the second cover 110, the cover 1500 of FIG. 15 includes an example arc-shaped line of weakness 1502 that substantially surrounds the pip 112. As set forth herein, the phrase "substantially surrounds the pip 112" means that the line of weakness 1502 is defined between about 180° and about 270° around the pip 112.

Figure 16:
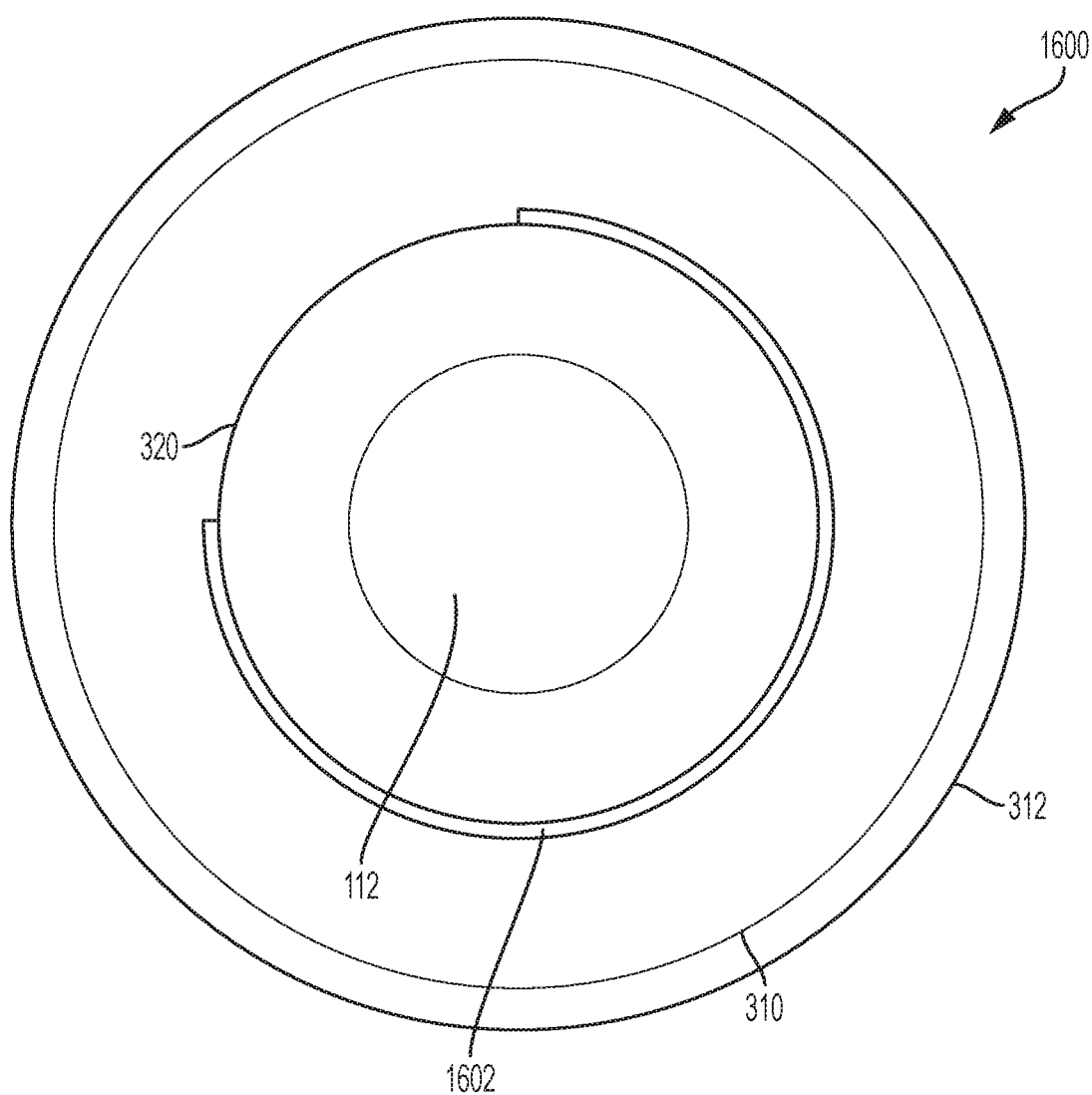
FIG. 16 illustrates another example cover including another example pressure release that can be used to implement the battery of FIG. 1.

FIG. 16 illustrates an example cover 1600 that is similar to the example cover 1500 of FIG. 15 and that can be used to implement the battery 100 of FIG. 1. In contrast to the cover 1500 of FIG. 15, the cover 1600 of FIG. 16 includes an example arc-shaped line of weakness 1602 that follows and/or is associated with the beginning 320 of the pip 112 whereas the line of weakness 1502 of FIG. 15 is defined closer to a center of the battery 100 and thus the pip 112. As shown, the line of weakness 1602 of FIG. 16 surrounds approximately 270° of the pip 112. However, the line of weakness 1602 may be longer or shorter than illustrated and/or may be positioned at any other location on the cover 1600 to enable pressure to equalize across the cover 1600 in a controlled manner during a pressure-equalization event.

Figure 17:
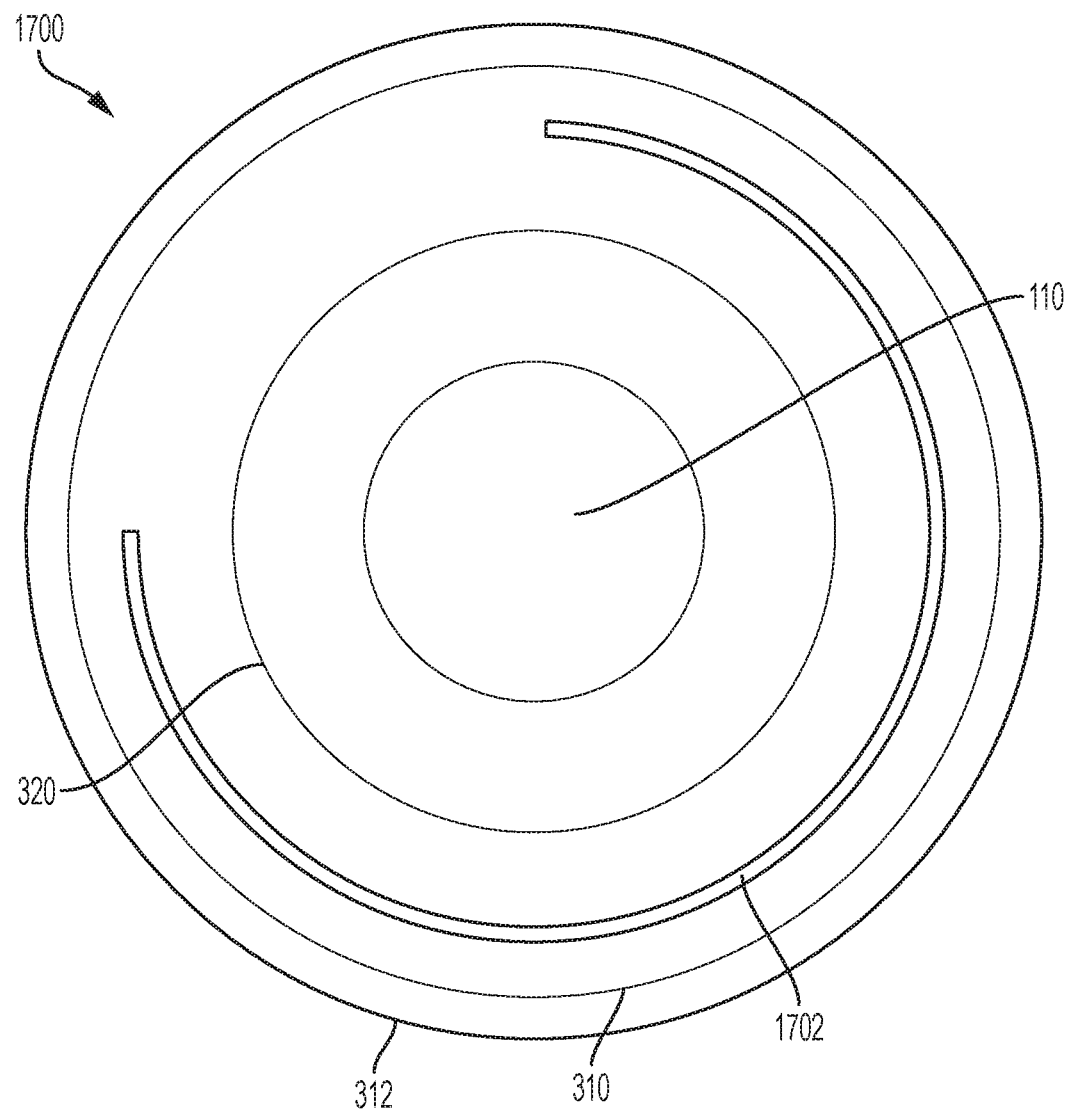
FIG. 17 illustrates another example cover including another example pressure release that can be used to implement the battery of FIG. 1.

FIG. 17 illustrates an example cover 1700 that is similar to the example cover 1600 of FIG. 16 and that can be used to implement the battery 100 of FIG. 1. In contrast to the cover 1600 of FIG. 16, the cover 1700 of FIG. 17 includes an example arc-shaped line of weakness 1702 positioned between the beginning 320 of the pip 112 and the interface 310 between the cover 1700 and the sidewall 312.

Figure 18:
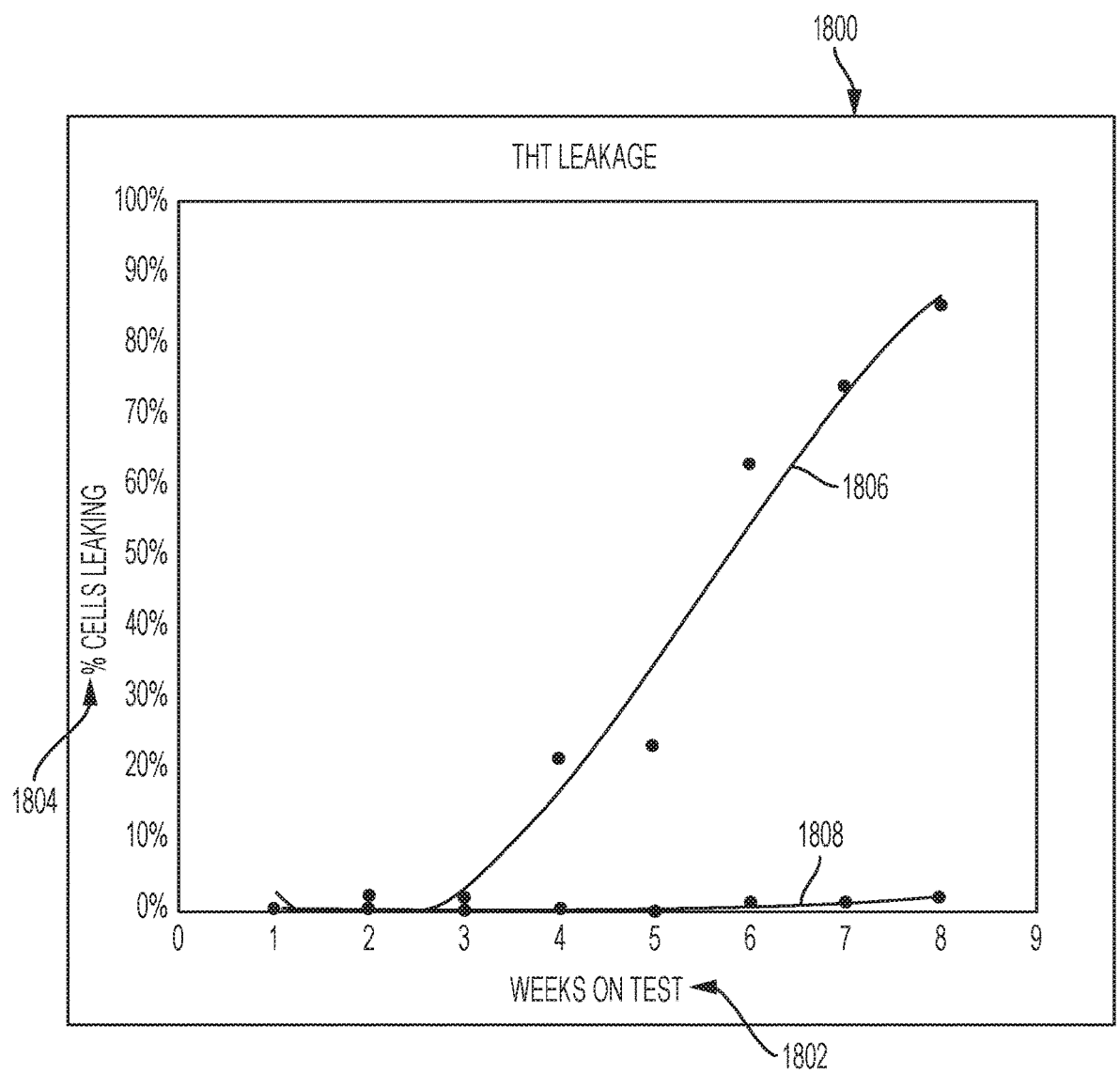
FIG. 18 illustrates a graph depicting results obtained from testing batteries having vents as disclosed herein.

FIG. 18 illustrates an example graph 1800 illustrating results of a Temperature Humidity Test (THT) performed on conventional batteries and batteries implemented with the teachings of this disclosure. During the Temperature Humidity Test, the batteries were subjected to a relatively constant temperature of 60° C. and relative humidity of 90%. As shown, an x-axis 1802 corresponds to the number of weeks that the batteries were tested, a y-axis 1804 corresponds to the percentage of batteries that leaked, a first line 1806 shows results associated with tests performed on conventional batteries and a second line 1808 shows results associated with tests performed on the example batteries disclosed herein. As illustrated and when comparing the first and second lines 1806, 1808, after eight weeks of tests, conventional batteries leak approximately 85% of the time while the example batteries disclosed leak less than 5% of the time, where both the conventional batteries and the example batteries disclosed are designed to leak (or vent gas) under certain conditions.

The examples disclosed herein may be implemented in primary batteries or secondary batteries. Primary batteries are meant to be discharged, e.g., to exhaustion, only once and then discarded. Primary batteries (or disposable batteries) are described, for example, in David Linden, *Handbook of Batteries* (4$^{th}$ ed. 2011). Secondary batteries (or rechargeable batteries) are intended to be recharged and used over and over again. Secondary batteries may be discharged and recharged many times, e.g., more than fifty times, a hundred times, or more. Secondary batteries are described, for example, in David Linden, *Handbook of Batteries* (4$^{th}$ ed. 2011).

Accordingly, batteries may include various electrochemical couples and electrolyte combinations. Although the examples disclosed herein are generally directed toward primary alkaline electrochemical cells, or batteries, it should be appreciated that the examples disclosed may be implemented in both primary and secondary batteries of aqueous, nonaqueous, ionic liquid, and solid state systems. For example, in addition to being a primary battery such as a primary alkaline battery, the battery may be a primary lithium-ion battery. Alternatively, the battery can be a secondary battery, for example, a secondary battery such as a nickel metal hydride (NiMH) battery, a nickel cadmium (NiCad) battery, a silver/zinc battery, a nickel/zinc battery, or a lithium solid state rechargeable battery. Primary and secondary batteries of the aforementioned systems are thus within the scope of this application and the scope of the disclosure is not limited by any particular example provided.

The examples disclosed herein relate to electrochemical cells, or batteries, including example vents that enable gases to vent when a threshold pressure is satisfied or, more generally, when a venting event occurs. In some examples, the batteries include a space for cathode expansion and/or a space under the top assembly for the anode to expand into.

Further, while several examples have been disclosed herein, any features from any examples may be combined with or replaced by other features from other examples. Moreover, while several examples have been disclosed herein, changes may be made to the disclosed examples within departing from the scope of the claims.

What is claimed:

1. A battery, comprising:
   a housing, including:
     a first terminal and a second terminal;
     the first terminal including a cover, the cover including at least one line of weakness therein, the line of weakness structured to form an opening when a threshold pressure is satisfied within the housing to enable gas to vent from the housing through the opening; and
     a filter positioned within the housing and adjacent the cover, the filter having an aperture structured to enable the gas to vent from the housing and to deter solid material housed within the housing from exiting the opening when the threshold pressure is satisfied.

2. The battery of claim 1, wherein the housing houses an anode and a cathode, a separator disposed between the anode and the cathode.

3. The battery of claim 1, wherein the housing includes a first space to accommodate anode expansion and a second space to accommodate cathode expansion.

4. The battery of claim 1, wherein the line of weakness is a score.

5. The battery of claim 4, wherein the score is positioned adjacent a sidewall of the housing and is covered by a label to further deter the solid material housed within the housing from exiting the opening when the threshold pressure is satisfied.

6. The battery of claim 4, wherein the score is longitudinally spaced from a cathode disposed in the housing.

7. The battery of claim 4, wherein the score includes an arc having a central portion adjacent the sidewall.

8. The battery of claim 1, wherein the line of weakness is approximately 8 millimeters long.

9. The battery of claim 1, wherein the aperture and the line of weakness are substantially aligned to enable the gas to pass through the aperture and to act on the cover to enable the line of weakness to form the opening when the threshold pressure is satisfied.

10. The battery of claim 1, wherein the filter is structured to reinforce the cover.

11. The battery of claim 1, wherein the line of weakness is a first line of weakness and the opening is a first opening, the cover further including a second line of weakness, the second line of weakness structured to form a second opening to enable the gas to vent from the housing when the threshold pressure is satisfied.

12. The battery of claim 11, wherein the cover includes a protrusion, the first line of weakness being disposed on a first side of the protrusion, the second line of weakness being disposed on a second side of the protrusion.

13. The battery of claim 1, wherein the filter includes a plurality of radially spaced apertures, the plurality of radially spaced apertures being structured to enable the gas to vent from the housing and to deter the solid material housed within the housing from exiting the opening when the threshold pressure is satisfied.

14. The battery of claim 1, wherein the first terminal is an anode and the second terminal is a cathode.

15. The battery of claim 1, further including a second cover that covers the line of weakness.

16. The battery of claim 1, wherein the line of weakness is a coin vent.

17. A battery, comprising:
   a housing including a first terminal and a second terminal, the first terminal having a cover including means for enabling gas to vent from the housing when a threshold pressure is satisfied, wherein the means for enabling the gas to vent from the housing when the threshold pressure is satisfied includes a line of weakness in the cover structured to form an opening in the cover when the threshold pressure is satisfied; and
   means for enabling solid material to remain housed within the housing when the threshold pressure is satisfied.

18. The battery of claim 17, wherein the line of weakness is an arch-shaped groove.

19. The battery of claim 17, wherein the means for enabling the solid material to remain housed within the housing when the threshold pressure is satisfied includes a filter positioned within the housing and adjacent the cover, the filter having a plurality of radially spaced apertures structured to enable the gas to vent from the housing and to deter solid material housed within the housing from exiting the opening when the threshold pressure is satisfied.

20. A battery, comprising:
   a housing, including:
     a first terminal and a second terminal;
     the first terminal including a cover having a pressure release, the pressure release actuatable to enable gas to vent from the housing when a threshold pressure is satisfied; and
     a filter positioned within the housing and adjacent the cover, the filter structured to enable the gas to vent from the housing and to deter solid material housed within the housing from exiting the housing.

21. The battery of claim 20, wherein the pressure release includes a line of weakness that is structured to sever when a threshold pressure is satisfied to form an opening to enable the gas to vent.

22. A battery, comprising:
   a housing including:
     a positive terminal; and
     a negative terminal, the positive terminal including an outermost cover including both a pip and a line of weakness adjacent the pip, the line of weakness structured to form an opening when a threshold pressure within the housing is satisfied.

* * * * *